US009258368B2

(12) United States Patent
Rasanen (10) Patent No.: US 9,258,368 B2
(45) Date of Patent: Feb. 9, 2016

(54) METHODS, APPARATUSES, AND RELATED COMPUTER PROGRAM PRODUCT FOR NETWORK ELEMENT RECOVERY (75) Inventor: Juha Antero Rasanen, Espoo (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 65 days.

(21) Appl. No.: 13/377,362

(22) PCT Filed: Jun. 9, 2009

(86) PCT No.: PCT/EP2009/057111
§ 371 (c)(1),
(2), (4) Date: Dec. 9, 2011

(87) PCT Pub. No.: WO2010/142327
PCT Pub. Date: Dec. 16, 2010

(65) Prior Publication Data
US 2012/0096177 A1 Apr. 19, 2012

(51) Int. Cl.
*G06F 15/16* (2006.01)
*H04L 29/08* (2006.01)
*H04L 29/14* (2006.01)

(52) U.S. Cl.
CPC ............... *H04L 67/14* (2013.01); *H04L 69/40* (2013.01)

(58) Field of Classification Search
CPC ....... H04L 67/14; H04L 69/40; H04L 67/142; H04L 12/14; H04L 12/5695; H04W 36/0022; H04W 76/028
USPC .................................................. 709/227, 228
See application file for complete search history.

(56) References Cited

U.S. PATENT DOCUMENTS

| 5,959,992 A * | 9/1999 | Benayoun et al. | 370/395.53 |
| 2003/0187991 A1 | 10/2003 | Lin et al. | |
| 2007/0153676 A1 | 7/2007 | Baglin et al. | |
| 2007/0153720 A1 * | 7/2007 | Baglin et al. | 370/328 |
| 2007/0291790 A1 * | 12/2007 | Ue et al. | 370/468 |
| 2008/0229385 A1 * | 9/2008 | Feder et al. | 726/1 |
| 2010/0202362 A1 * | 8/2010 | Harikumar et al. | 370/328 |

* cited by examiner

OTHER PUBLICATIONS

3GPP TSG CT WG3 Meeting #52, C3-090522, Sophia Antipolis (France), Apr. 20-24, 2009, Source: NEC, Title: Discussion paper on "PCRF Restoration", Agenda item: 11.3, Document for: Discussion, pp. 1-4.
3rd Generation Partnership Project; Technical Specification Group Services and System Aspects; Policy and charging control architecture (Release 9) 3GPP Standard; 3GPP TS 23.203, 3rd Generation Partnership Project (3GPP), Mobile Competence Centre ; 650, Route Des Lucioles ; F-06921 Sophia-Antipolis Cedex ; France, No. V9.0. 0, pp. 1-113.
3GPP TS 23.007 V8.3.0 (Mar. 2009) Technical Specification 3rd Generation Partnership Project; Technical Specification Group Core Network; Restoration procedures (Release 8), pp. 1-32.
3GPP TS 23.003 V8.4.0 (Mar. 2009) Technical Specification 3rd Generation Partnership Project; Technical Specification Group Core Network and Terminals; Numbering, addressing and identification (Release 8), pp. 1-71.
International Search Report and Written Opinion dated Jun. 17, 2010 for the corresponding International PCT Application No. PCT/EP2009/057111.

*Primary Examiner* — Brian J Gillis
*Assistant Examiner* — Shean Tokuta
(74) *Attorney, Agent, or Firm* — Squire Patton Boggs (US) LLP

(57) ABSTRACT

It is disclosed a method (and related apparatus) comprising establishing a control session by transmitting and receiving control session-related messages, transmitting restart information indicating a restart of a network element, receiving at least one protocol-related message of a first control session including session-related detail information, transmitting a restoration request message based on the session-related detail information, receiving at least one session parameter necessary for restoring the at least one first session, and restoring the at least one first session based on the received session-related detail information and the at least one session parameter. It is further disclosed a method (and related apparatus) comprising receiving restart information indicating a restart of a network element, processing at least one protocol-related message of a first control session to include session-related detail information, and transmitting at least one session parameter necessary for restoring the at least one first session, and the at least one protocol related message.

20 Claims, 4 Drawing Sheets

Fig. 4

METHODS, APPARATUSES, AND RELATED COMPUTER PROGRAM PRODUCT FOR NETWORK ELEMENT RECOVERY

FIELD OF THE INVENTION

Examples of the present invention relate to network element recovery. More specifically, the examples of the present invention relate to methods, apparatuses, and a related computer program product for network element recovery. The examples of the present invention may be applicable e.g. to policy and charging control (PCC) in a packet based mobile network (e.g. 3$^{rd}$ generation partnership project (3GPP) system architecture evolution (SAE)), for example recovery and restoration from a failure of a PCC network element.

BACKGROUND

When a network entity, such as a policy and charging rules function (PCRF), fails and/or restarts, the existing/ongoing user sessions may be maintained with no or minimal damage. This may be facilitated by the use of some kind of a recovery mechanism to restore the status and data of the ongoing sessions in the re-started network entity. When "hot redundancy" (i.e. every critical network entity is doubled, the second entity running active ("hot") beside the first entity and maintaining the session statuses and data) is not used, at least some of the other network entities connected to the re-started entity may be involved, actively or passively, in restoring the session statuses and data in the restarted entity.

There have been considerations on restoration procedures for a network element. For example, restoring a pre-failure status of user sessions e.g. in the PCRF may be achieved e.g. by fetching the session status information and the related parameters from the network elements connected to the PCRF. Furthermore, restoration procedures may use protocols (e.g. general packet radio service (GPRS) tunneling protocol (GTP)) that comprise different planes (e.g. control plane, user plane) that separate the control and management functions from the user plane/user session functions.

Figure 1:
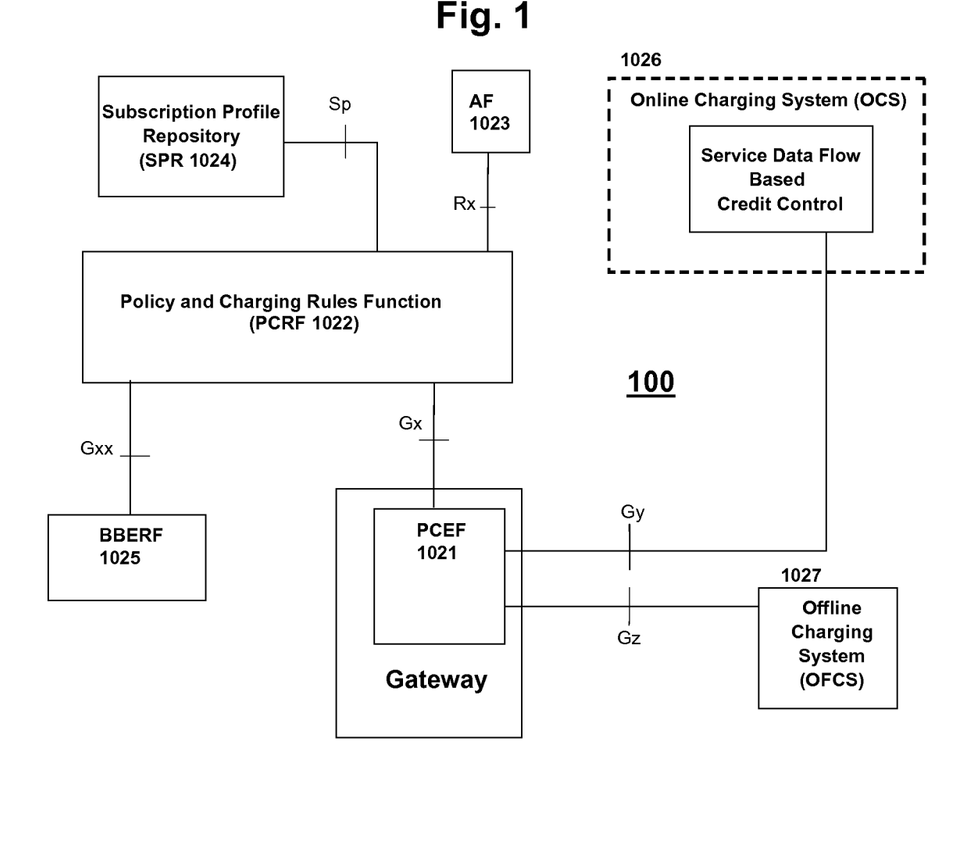
FIG. 1 shows the above general network scheme being a deployment scenario for a network element recovery scheme.

FIG. 1 shows a general network scheme being a deployment scenario for a network element recovery scheme. Thus, FIG. 1 shows a communication system 100 that may comprise a user equipment (UE) (not shown) and a network (not shown). In turn, the network may comprise a policy and charging enforcement function (PCEF) 1021, a PCRF 1022, an application function (AF) 1023, a subscription profile repository (SPR) 1024, a bearer binding and event reporting function (BBERF) 1025, an online charging system (OCS) 1026 and an offline charging system (OFCS) 1027.

However, in case of failure e.g. of the PCRF 1022, a backup instance is required, such as PCEF 1021, AF 1023, or BBERF 1025. The backup instance already contains at least some session state information, and is used after the failure. In that case, the failed and restarted entity is up-dated/restored with the latest/up-to-date session information.

In consideration of the above, according to examples of the present invention, methods, apparatuses and a related computer program product for network element recovery are provided.

In this connection, the examples of the present invention enable one or more of the following:

Alleviating the need for load and dedicated support for the restoration measures in the network elements connected e.g. to the PCRF, i.e. in AF/P-CSCF, the gateways (P-GW, S-GW) and the subscription profile repository (SPR);

Avoiding mixing the network management issues within the user plane/user session related diameter protocols, if/when the restoration principles are applied to the PCRF interfaces, thus avoiding complicated, non-layered/non-modular specifications and implementations;

Keeping complexity low, i.e. implementations of network elements will not suffer from any extra complexity brought by the recovery and restoration procedures;

Avoiding network incompatibilities, if some network elements support the recovery and restoration extras and some do not or they support different mechanisms;

Providing information, on when and where a fatal failure and/or restart has taken place, to all entities involved in restoring the session statuses and data of a restarting entity;

Providing certainty about what exactly is expected from the involved entities and what triggers the actions; which party initiates the session recovery and how; what information does the restarted entity need from the counterparts;

Allowing re-binding of user and control sessions and control sessions related to each other and guaranteeing seamless operation/continuation of the ongoing user sessions by specifying how user/UE related control sessions used, with all protocol related details/parameters, between the restarted entity and the other counterparts are re-established/refreshed;

Coping with a restarting entity having lost all its session information, i.e. session statuses are restored from zero to the restarted entity;

Allowing recovery/restoration after failure/restart of a network element with a minimum impact on ongoing sessions and neighboring network elements and interfaces with simple implementations and loading minimized during the recovery/restoration, i.e. no loading peaks;

Allowing the entity having experienced failure and restart to find its former/pre-restart peer network entities.

BRIEF DESCRIPTION OF THE DRAWINGS

The examples of the present invention are described herein below with reference to the accompanying drawings, in which.

DETAILED DESCRIPTION OF THE EXAMPLES OF THE PRESENT INVENTION

The examples of the present invention are described herein below by way of example with reference to the accompanying drawings.

It is to be noted that for this description, the terms "PCRF; PCEF, AF/P-CSCF and/or SPR; user/UE ID and/OR IP address; and request message and/or user plane event" are examples for "restarted element; connected/related element; session-related detail information; and protocol-related message", respectively, without restricting the latter-named terms to the special technical or implementation details imposed to the first-named terms.

Figure 2:
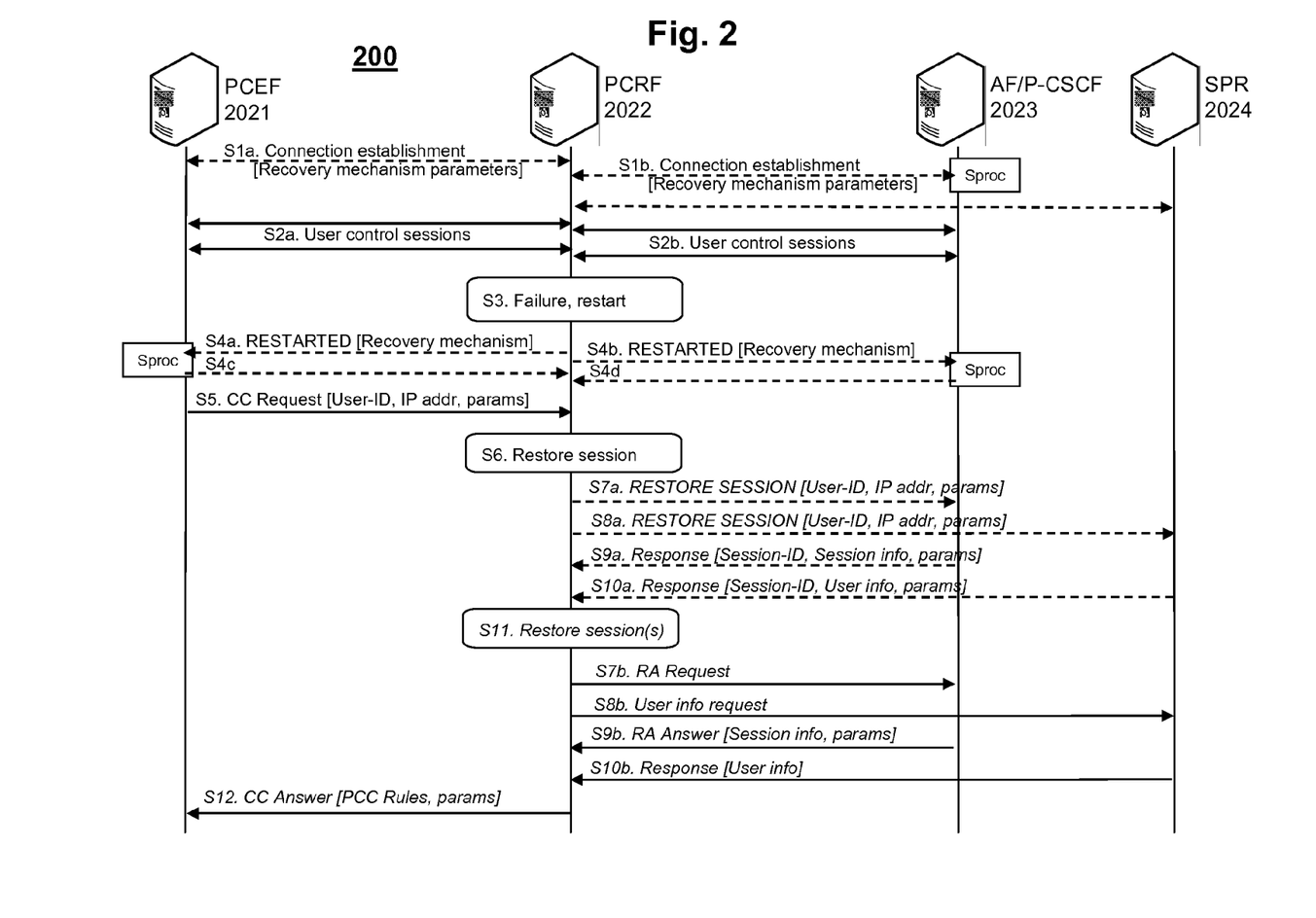
FIG. 2 shows methods for network element recovery according to a first example of the present invention.
Figure 3:
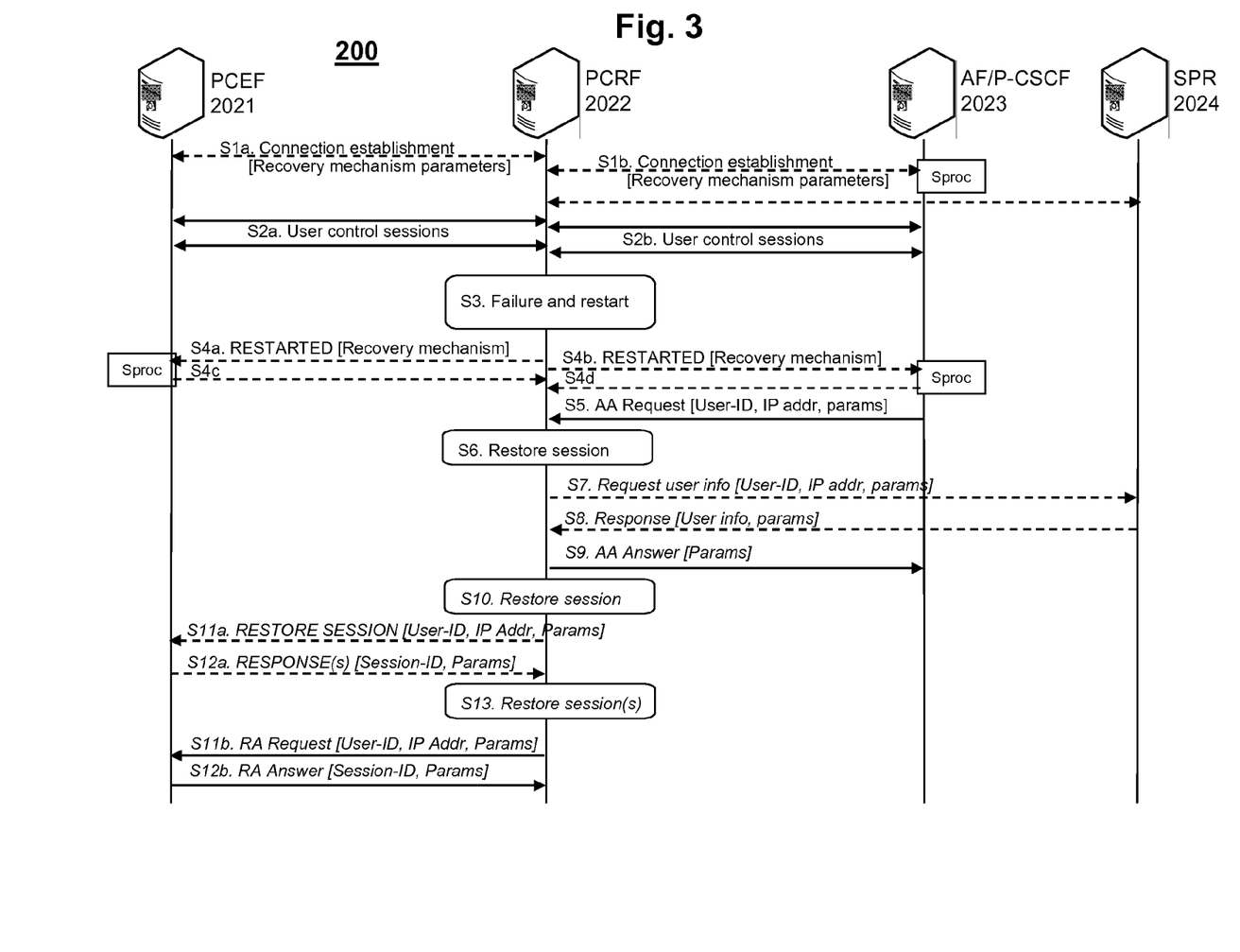
FIG. 3 shows methods for network element recovery according to a second example of the present invention.

FIGS. 2 and 3 show the methods for network element recovery according to the first and second examples of the present invention. Signaling between elements is indicated in horizontal direction, while time aspects between signaling may be reflected in the vertical arrangement of the signaling sequence as well as in the sequence numbers. It is to be noted that the time aspects indicated in FIGS. 2 and 3 do not necessarily restrict any one of the method steps shown to the step sequence outlined. This applies in particular to method steps that are functionally disjunctive with each other. Within FIGS. 2 and 3, for ease of description, means or portions which may provide main functionalities are depicted with solid functional blocks or arrows and/or a normal font, while means or portions which may provide optional functions are depicted with dashed functional blocks or arrows and/or an italic font.

As shown in FIGS. 2 and 3, a communication system 200 may comprise a UE (not shown) and a network (not shown). In turn, the network may further comprise a PCEF 2021, a PCRF 2022, an AF/P-CSCF 2023 and an SPR 2024.

Example 1

(FIG. 2), e.g. PCEF may trigger session recovery/restoration after PCRF restart.

As shown in FIG. 2, in steps S1a and S1b, e.g. the PCRF 2022 and network elements 2021, 2023, 2024 connected to the PCRF 2022 may establish a control session by transmitting and receiving control session-related messages.

As shown in FIG. 2, in steps S4a or S4b, e.g. the PCRF 2022 may perform transmitting restart information indicating a restart of a network element. The transmitted restart information may be received by the PCEF 2021, the AF/P-CSCF 2023 or the SPR 2024.

Then, in step Sproc, e.g. the PCEF 2021, the AF/P-CSCF 2023 or the SPR 2024 may perform processing at least one protocol-related message of a first control session to include session-related detail information based on the received restart information.

In steps S4c or S4d, e.g. the PCEF 2021, the AF/P-CSCF 2023 or the SPR 2024 may perform transmitting, responsive to the receiving, the at least one protocol related message of a first control session.

Then, in steps S4c or S4d, e.g. the PCRF 2022 may perform receiving, the at least one protocol-related message of a first control session, including session-related detail information. The protocol-related message of a first control session may comprise an indication information indicating a need for restoration of at least one session.

Thus, in step S6, e.g. the PCRF 2022 may perform restoring the at least one first session based on the received session-related detail information and the at least one session parameter.

As developments for the method pertaining to the PCRF 2022, in optional steps S7a, S8a, S7b or S8b, the PCRF 2022 may perform the above restoring further comprising second transmitting a restoration request message based on the session-related detail information, and, in optional steps S9a, S10a, S9b or S10b, second receiving at least one session parameter necessary for restoring the at least one first session.

The network element to which the restoration request message is sent may be found using e.g. one of the following: (a) Session identifiers and/or user/UE identifiers and/or IP address are received from an entity that received the restart information; (b) The restarted entity (e.g. PCRF) may send the restoration request to all possible entities and receives an acknowledgement from the entity that recognizes the parameters of the message; (c) Session identifiers and/or user/UE identifiers and/or IP addresses of network elements are saved in a network entity and restored by the restarted entity after the restart.

The restoring may further comprise restoring a second control session related to the first control session, based on the transmitted restoration request message and the received at least one session parameter, and binding the first control session and the second control session, based on the received session parameter(s) and/or detail information.

Further, the protocol-related message may be e.g. a session modification request or a user plane event report message received from a policy and charging enforcement function, an application function or a bearer binding and event reporting function, and the restoration request message may be a restore session request transmitted to a policy and charging enforcement function, an application function, bearer binding and event reporting function or a subscription profile repository. Alternatively or additionally, the restoration request message may be a regular request message requesting session information from an application function or from a policy and charging enforcement function and requesting user information from a subscription profile repository.

Still further, the indication information may be constituted explicitly by indication information. Alternatively, the indication information may be constituted implicitly by reception of the protocol-related message.

Finally e.g. the PCRF 2022 may perform requesting from any related network element (e.g. PCEF, AF, SPR), after a preconfigured time, restoration of at least one session not yet restored but started before the restart.

As developments for the method pertaining to the PCEF 2021, the AF/P-CSCF 2023 or the SPR 2024, the transmitting may further comprise transmitting the indication information indicating the need for restoring at least one session.

As developments for the method pertaining to the PCRF 2022 as well as to the PCEF 2021, the AF/P-CSCF 2023 or the SPR 2024, the restart information may be part of a restarted message, and the session-related detail information may comprise user or UE identifications and/or internet protocol addresses. In that case, the session-related detail information may further comprise session identifications. Alternatively, the restart information may be part of a restore session message or a Diameter or application message and may comprise user identifications and/or internet protocol addresses, and the session-related detail information may be part of an acknowledgement message from an entity recognizing the at least one of user identifications and internet protocol addresses. Alternatively, the session-related detail information may be stored upon each control session establishment and may comprise user identifications and/or internet protocol addresses.

Further, e.g. the PCRF 2022 as well as the PCEF 2021, the AF/P-CSCF 2023 or the SPR 2024 may perform, at the establishment of the control session or at a later message exchange before the restart or at the restart indication message exchange, negotiating a restoration scheme upon connection set up for a control session. Alternatively, the negotiating may be performed upon performing a session-related message exchange or a non-session-related message exchange. Alternatively, the PCRF 2022 as well as the PCEF 2021, the AF/P-CSCF 2023 or the SPR 2024 may perform pre-configuring the restoration scheme. Negotiable issues may comprise e.g. an indication to use an indication to inform about a restart, an indication to use soft recovery (i.e. the related session statuses at the restarted entity are restored only when there is anyway a reason to perform message exchange for other purposes like e.g. a user session update), an indication to send identifiers of active sessions and/or user/UE identifiers and/or IP addresses from related entities to the restarted entity after a restart for example to help the restarted entity identify correct network elements, messages (e.g. dedicated or regular) and protocols (e.g. a dedicated protocol or the application protocol) used for recovery purposes, parameters (e.g. session identifiers, user or UE identifiers, IP addresses) required or used in recovery/restoration messages/responses.

Still further, the restoring may further comprise restoration of session bindings based on internet protocol addresses and user or UE identifications. Moreover, restart information may not be transmitted prior to an exchange of session termination messages.

In addition, the indication information may be triggered by modification of a session. Alternatively, the indication information may be triggered by a user plane event or by a subscription to an event.

In other words, the first example of the present invention may comprise the following:

Steps 1a, 1b: Connections may be established between the clients (e.g. PCEF 2021, AF 2023) and the server (PCRF 2022). The use and details of a recovery mechanism may be negotiated during/upon the connection establishment message exchange.

Steps 2a, 2b: User/UE session (e.g. IP-CAN session, AF session) related Diameter control sessions may be established between PCEF 2021 and PCRF 2022 and between AF 2023 and PCRF 2022.

Step 3: PCRF 2022 may restart for some reason.

Steps 4a, 4b, 4c, 4d: PCRF 2022 may inform the related network elements (e.g. PCEF/GW 2021, AF 2023) about the restart. The use and details of a recovery mechanism may be negotiated with a message exchange with the related network elements.

Step 5: For example, an IP connectivity access network (IP-CAN) session modification or a user plane event may produce e.g. a request message (e.g. a Diameter CC Request message) from the PCEF 2021 to the PCRF 2022. The PCEF 2021 may include user/UE ID and/or IP address and possibly other parameters in the message to enable the PCRF 2022 to recover/restore the session details lost in the restart. Knowing that the system is recovering from a PCRF 2022 restart, the PCEF 2021 may include a parameter to indicate that the request relates to an existing session.

Step 6: PCRF 2022 may have no status information for the session ID in the request, but the PCRF 2022 may assume this session exists, because of the indication from the PCEF 2021 (or simply because a request was received after a restart where session statuses were lost). PCRF 2022 may restore the session status, e.g. may store the session-ID and possibly other session information and parameters for the User/UE identity and/or IP address related control session. PCRF 2022 may also start re-creating the related control sessions with other network elements (e.g. AF 2023, SPR 2024), because the PCRF 2022 may have lost the statuses and data (e.g. session ID) of the control session upon the failure/restart.

Step 7a: PCRF 2022 may send a RESTORE SESSION request to AF 2023 to restore the related control session with the AF 2023 and possibly to get the related session information (lost during the failure/restart). PCRF 2022 may use the user/UE ID and/or IP address, and possibly other parameters, received from PCEF 2021, to identify the session towards the AF 2023.

Step 8a: PCRF 2022 may also send a RESTORE SESSION request to SPR to restore the related control session with the SPR and possibly to get the related user/subscription information (lost during the failure/restart). PCRF 2022 may use the user/UE ID and/or IP address, and possibly other parameters, received from PCEF 2021, to identify the session towards the SPR 2024.

Step 9a: AF 2023 may acknowledge the SESSION RESTORE request and may send the session ID, session information and possibly other parameters to the PCRF 2022.

Step 10a: SPR 2024 may acknowledge the SESSION RESTORE request and may send the session ID, user/subscription information and possibly other parameters to the PCRF 2022.

Step 11: PCRF 2022 may restore the session status(es), e.g. may store the session-ID(s) and other session status information and parameters for the User/UE identity and/or IP address related control session.

Steps 7b to 10b: PCRF 2022 may use further, regular control session related Diameter messages to get session or user/subscription related information or to report events to AF 2023 or SPR 2024, if the session restore message exchange (steps 7a to 10a) did not cover these issues.

Step 12: As a response to the CC Request from the PCEF 2021 (step 5), the PCRF 2022 may send a CC Answer, including PCC rules (created from the session information received from AF 2023 and possibly from the user information if fetched from the SPR 2024) to the PCEF 2021.

Example 2

(see FIG. 3), e.g. AF may trigger session recovery/restoration after PCRF restart:

In other words, the second example of the present invention may comprise the following:

Steps 1a, 1b: Connections may be established between the clients (e.g. PCEF 2021, AF 2023) and the server (PCRF 2022). The use and details of a recovery mechanism may be negotiated during/upon the connection establishment message exchange.

Steps 2a, 2b: User/UE session (IP-CAN session, AF session) related Diameter control sessions may be established between PCEF 2021 and PCRF 2022 and between AF 2023 and PCRF 2022.

Step 3: PCRF 2022 may restart for some reason.

Step 4a, 4b: PCRF 2022 may inform the related network elements (e.g. PCEF/GW 2021, AF 2023) about the restart. The use and details of a recovery mechanism may be negotiated with a message exchange with the related network elements.

Step 5: For example, an AF 2023 session modification or a need to change a subscription to user plane events may produce a request message (e.g. a Diameter AA Request) from the AF 2023 to the PCRF 2022. The AF 2023 may include user/UE ID and/or IP address and possibly other parameters in the message to enable the PCRF 2022 to recover/restore the session details lost in the restart. Knowing that the system is recovering from a PCRF 2022 restart, the AF 2023 may include a parameter to indicate that the request relates to an existing session.

Step 6: PCRF 2022 may have no status information for the session ID in the request, but the PCRF 2022 may assume this session exists, because of the indication from the AF 2023 (or simply because a request was received after a restart where session statuses were lost). PCRF 2022 may restore the session status, e.g. stores the session-ID and possibly other session information and parameters for the User/UE identity and/or IP address related control session. PCRF 2022 may also start re-creating the related control sessions with other network elements (e.g. SPR 2024, PCEF 2021), because the PCRF 2022 may have lost the statuses and data (e.g. session ID) of the control session upon the failure/restart.

Step 7: PCRF 2022 may also send a RESTORE SESSION request to SPR 2024 to restore the related control session with the SPR 2024 and possibly to get the related user/subscription information (lost during the failure/restart). PCRF 2022 may use the user/UE ID and/or IP address, and possibly other parameters, received from AF 2023, to identify the session towards the SPR 2024.

Step 8: SPR 2024 may acknowledge the SESSION RESTORE request and may send the session ID, user/subscription information and possibly other parameters to the PCRF 2022.

Step 9: As a response to the AA Request from the AF 2023 (step 5), the PCRF 2022 may send an AA Answer to the AF 2023.

Step 10: PCRF 2022 may restore the session status, e.g. may store the session-ID and other session status information and parameters for the User/UE identity and/or IP address related control session.

Step 11a: PCRF 2022 may send a RESTORE SESSION request to PCEF 2021 to restore the related control session with the PCEF 2021. PCRF 2022 may use the user/UE ID and/or IP address, and possibly other parameters, received from AF 2023, to identify the session towards the PCEF 2021. The PCRF 2022 may also send other session related information, e.g. PCC rules and event subscriptions, in the session restore command to the PCEF 2021.

Step 12a: PCEF 2021 may acknowledge the SESSION RESTORE request and may send the session ID, and possibly other parameters, e.g. the IP-CAN session related details/parameters, to the PCRF 2022.

Step 13: PCRF 2022 may restore the session status, e.g. may store the session-ID and other session status information and parameters for the user/UE identity and/or IP address related control session.

Steps 11b to 12b: PCRF 2022 may use further, regular control session related Diameter messages to send session related information, e.g. PCC rules and event subscriptions, if the session restore message exchange (steps 11a and 12a) did not cover these issues.

Figure 4:
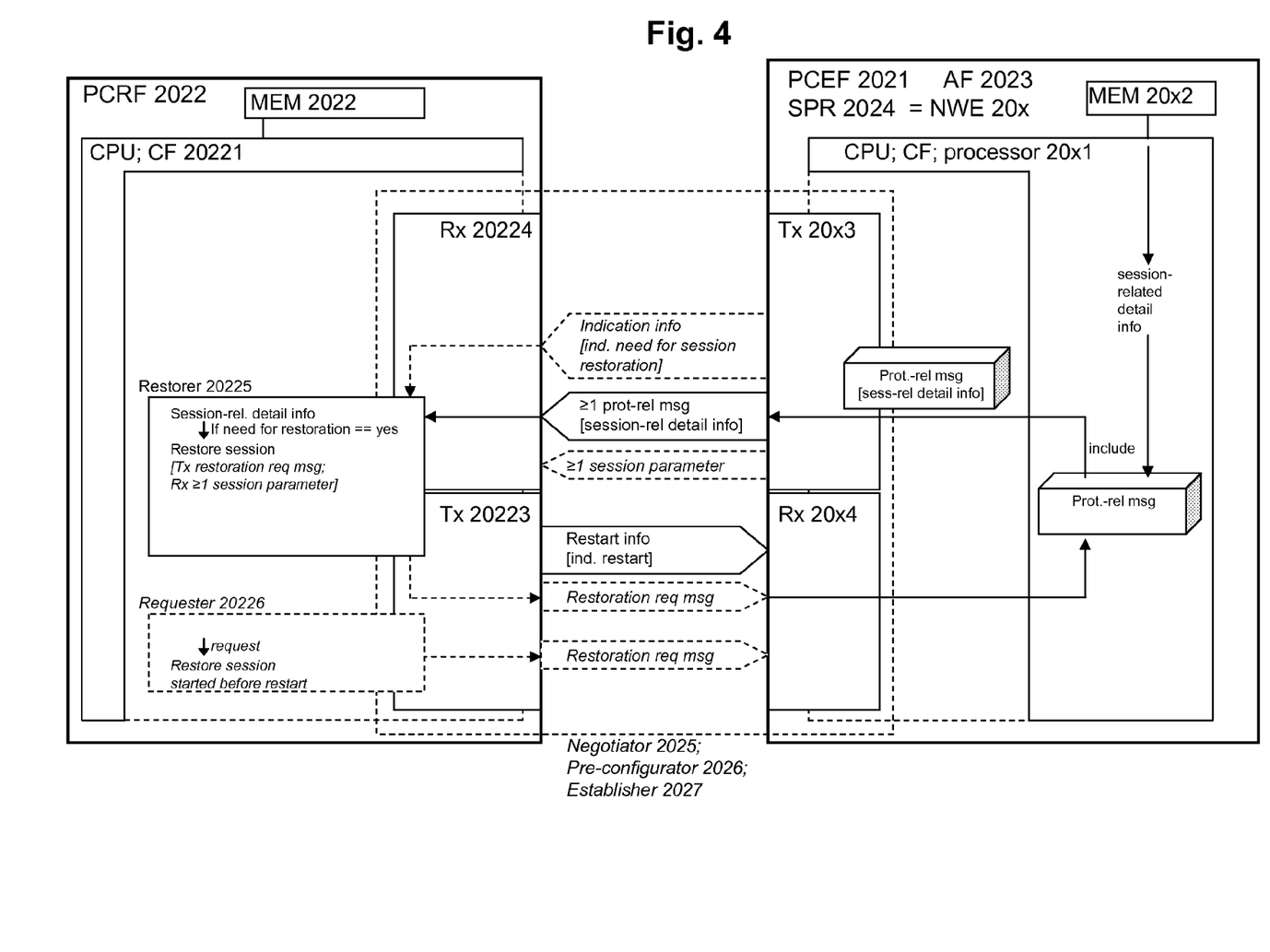
FIG. 4 shows apparatuses for network element recovery according to the first and second examples of the present invention.

FIG. 4 shows apparatuses (e.g. PCRF 2022 and PCEF 2021, AF 2023 or SPR 2024, referred to as network element (NWE) 20x hereinafter) for network element recovery according to the first and second examples of the present invention. Within FIG. 4, for ease of description, means or portions which may provide main functionalities are depicted with solid functional blocks or arrows and/or a normal font, while means or portions which may provide optional functions are depicted with dashed functional blocks or arrows and/or an italic font.

The PCRF 2022 may comprise a CPU (or core functionality CF) 20221, a memory 20222, a transmitter (or means for transmitting) 20223, a receiver (or means for receiving) 20224, a restorer (or means for restoring) 20225 and an optional requester (or means for requesting) 20226.

Further, NWE 20x may comprise a CPU (or core functionality CF or processor or means for processing) 20x1, a memory 20x2, a transmitter (or means for transmitting) 20x3 and a receiver (or means for receiving) 20x4.

As indicated by the dashed extensions of the functional blocks of the CPU 20221 or 20x1, the means for restoring 20225 and the means for requesting 20226 of the PCRF 2022 may be functionalities running on the CPU 20221 or 20x1 of the PCRF 2022 or NWE 20x, or may alternatively be separate functional entities or means.

The CPUs 20x1 (wherein x=21, 22, 23 and 24) may respectively be configured, for example by software residing in the memory 20x2, to process various data inputs and to control the functions of the memories 20x2, the means for transmitting 202x3 and the means for receiving 20x4 (and the means for restoring 20225 and the means for requesting 20226 of the PCRF 2022). Further, it is to be noted that the CPUs 20x1, the means for transmitting 20x3 and the means for receiving 20x4 may constitute means for negotiating 2025, means for pre-configuring 2026 or means for establishing 2027 in the sense of the first and second examples of the present invention. The memories 20x2 may serve e.g. for storing code means for carrying out e.g. the methods according to the example of the present invention, when run e.g. on the CPUs 20x1. It is to be noted that the means for transmitting 20x3 and the means for receiving 20x4 may alternatively be provided as respective integral transceivers. It is further to be noted that the transmitters/receivers may be implemented i) as physical transmitters/receivers for transceiving e.g. via the air interface (e.g. between the UE and the PCRF 2022 via some other network element), ii) as routing entities e.g. for transmitting/receiving data packets e.g. in a PS (packet switching) network (e.g. between the PCRF 2022 and NWE 20x when disposed as separate network entities), iii) as functionalities for writing/reading information into/from a given memory area (e.g. in case of shared/common CPUs or memories e.g. of the PCRF 2022 and NWE 20x when disposed as an integral network entity), or iv) as any suitable combination of i) to iii).

As shown in FIG. 4, e.g. the means for establishing 2027 of the PCRF 2022 and network elements 2021, 2023, 2024 connected to the PCRF 2022 may establish a control session by transmitting and receiving control session-related messages.

As shown in FIG. 4, e.g. the means for transmitting 20223 of the PCRF 2022 may perform transmitting restart information indicating a restart of a network element. The transmitted restart information may be received by the means for receiving 20x4 of the PCEF 2021, the AF/P-CSCF 2023 or the SPR 2024.

Then, e.g. the means for processing 20x1 of the PCEF 2021, the AF/P-CSCF 2023 or the SPR 2024 may perform processing at least one protocol-related message of a first control session to include session-related detail information based on the received restart information.

For example, the means for transmitting 20x3 of the PCEF 2021, the AF/P-CSCF 2023 or the SPR 2024 may perform transmitting the at least one protocol related message of a first control session.

Then, e.g. the means for receiving 2024 of the PCRF 2022 may perform receiving the at least one protocol-related message of a first control session, including session-related detail information. The protocol-related message of a first control session may comprise an indication information indicating a need for restoration of at least one session.

Thus, e.g. the means for restoring 20225 of the PCRF 2022 may perform restoring the at least one first session based on the received session-related detail information and the at least one session parameter.

As developments for the PCRF 2022, e.g. the means for restoring 20225 of the PCRF 2022 may perform the above restoring further by second transmitting a restoration request message based on the session-related detail information, and second receiving at least one session parameter necessary for restoring the at least one first session.

The network element to which the restoration request message is sent may be found using e.g. one of the following: (a) Session identifiers and/or user/UE identifiers and/or IP address are received from an entity that received the restart information; (b) The restarted entity (e.g. PCRF) may send the restoration request to all possible entities and receives an acknowledgement from the entity that recognizes the parameters of the message; (c) Session identifiers and/or user/UE identifiers and/or IP addresses of network elements are saved in a network entity and restored by the restarted entity after the restart.

The means for restoring may further be configured to restore a second control session related to the first control session, based on the transmitting restoration request message and the received at least one session parameter, and to bind the first control session and the second control session, based on the received session parameter(s) and/or detail information.

Further, the protocol-related message may be e.g. a session modification request or a user plane event report message received from a policy and charging enforcement function, an application function or a bearer binding and event reporting function, and the restoration request message may be a restore session request transmitted to a policy and charging enforcement function, an application function, bearer binding and event reporting function or a subscription profile repository. Alternatively or additionally, the restoration request message may be a regular request message requesting session information from an application function or from a policy and charging enforcement function and requesting user information from a subscription profile repository.

Still further, the indication information may be constituted explicitly by indication information. Alternatively, the indication information may be constituted implicitly by reception of the protocol-related message.

Finally, e.g. the means for requesting 20226 of the PCRF 2022 may perform requesting from any related network element (e.g. PCEF, AF, SPR), after a preconfigured time, restoration of at least one session not yet restored but started before the restart.

As developments for the PCEF 2021, the AF/P-CSCF 2023 or the SPR 2024, the transmitting may further comprise transmitting the indication information indicating the need for restoring at least one session.

As developments for the PCRF 2022 as well as to the PCEF 2021, the AF/P-CSCF 2023 or the SPR 2024, the restart information may be part of a restarted message, and the session-related detail information may comprise user or UE identifications and/or internet protocol addresses. In that case, the session-related detail information may further comprise session identifications. Alternatively, the restart information may be part of a restore session message or a diameter or application message and may comprise user identifications and/or internet protocol addresses, and the session-related detail information may be part of an acknowledgement message from an entity recognizing the at least one of user identifications and internet protocol addresses. Alternatively, the session-related detail information may be stored upon each control session establishment and may comprise user identifications and/or internet protocol addresses.

Further, e.g. the means for negotiating 2025 of the PCRF 2022 as well as the PCEF 2021, the AF/P-CSCF 2023 or the SPR 2024 may perform, prior to the transmitting, at the establishment of the control session or at a later message exchange before the restart or at the restart indication message exchange, negotiating a restoration scheme upon connection set up for a control session. Alternatively, the negotiating may be performed upon performing a session-related message exchange or a non-session-related message exchange. Alternatively, the means for pre-configuring 2026 of the PCRF 2022 as well as the PCEF 2021, the AF/P-CSCF 2023 or the SPR 2024 may perform, prior to the transmitting, pre-configuring the restoration scheme. Negotiable issues may comprise e.g. an indication to use an indication to inform about a restart, an indication to use soft recovery (i.e. the related session statuses at the restarted entity are restored only when there is anyway a reason to perform message exchange for other purposes like e.g. a user session update), an indication to send identifiers of active sessions and/or user/UE identifiers and/or IP addresses from related entities to the restarted entity after a restart for example to help the restarted entity identify correct network elements, messages (e.g. dedicated or regular) and protocols (e.g. a dedicated protocol or the application protocol) used for recovery purposes, parameters (e.g. session identifiers, user or UE identifiers, IP addresses) required or used in recovery/restoration messages/responses.

Still further, the means for restoring 20225 may further be configured to restore session bindings based on internet protocol addresses and user or UE identifications. Moreover, no restart information may not be transmitted prior to an exchange of session termination messages.

In addition, the indication information may be triggered by modification of a session. Alternatively, the indication information may be triggered by a user plane event or by a subscription to an event.

Furthermore, all additional or optional method features described hereinabove in conjunction with FIGS. 2 and 3 also apply as corresponding apparatus features and are not repeated for the sake of description brevity.

Furthermore, at least one of, or more of the above-described means for transmitting 20223, 20x3, means for receiving 20224, 20x4, means for restoring 20225, means for requesting 20226, means for processing 20x1, means for negotiating 2025, means for pre-configuring 2026 and means for establishing 2027 as well as the PCRF 2022 and NWE 20x, or the respective functionalities carried out, may be implemented as a chipset, module or subassembly.

Finally, the present invention also relates to a system which may comprise the PCRF 2022 and NWE 20x according to the above-described first and second examples of the present invention.

Without being restricted to the details following in this section, the examples of the present invention may be summarized as follows:

A network element negotiates with connected/related network elements on whether a recovery/restoration mechanism is used, and possible what kind of a mechanism, to restore the session statuses, if a failure and/or restart of the element takes place.

A soft recovery mechanism for a failure and/or restart of the network element may comprise:
  The restarted element may inform the connected/related element(s) about the restart.
  The restarted element and the connected/related element(s) may let the ongoing user sessions go on (with no immediate recovery/restoration action for the restarted element).
  The informed element(s) may prepare for recovering/restoring sessions at/with the restarted element by
    Including session related details, like user/UE ID and/or IP address, in regular protocol messages, e.g. request messages induced by user session modifications or by user plane events that shall be reported.
    Possibly including an indication in a session modification request, when the request is related to a session that was started before the restart and the session has not yet been recovered/restored.

Accepting recovery/restoration specific messages requesting information for session recovery/restoration from the restarted element and by responding to the messages and including the required/requested information.

The restarted element may restore the lost sessions only when a real need appears, e.g. a modification request is received from a connected/related network element. Then the restarted element may assume a session related to the request exists, and the restarted element sends "recovery request" message(s) to related other network element(s) to restore the related lost session(s) with them and possibly to get the request related information from the element(s).

"Recovery request" messages and responses may contain session related information, i.e. being also user control session related messages at the same time, to minimize the required message exchange. Alternatively, the "recovery request" messages may be followed by regular session related messages.

The restarted element may, e.g. after a preconfigured time, request the restoration of the sessions not yet restored but started before the crash. This action clears the restart status and returns the related network elements to normal operation. (The longer the timer is the less sessions there are to update and the less loading is caused on the network elements and on the interfaces.)

Usage of PCRF (=Restarting Element), AF and PCEF as Involved Network Elements:

PCRF may agree/negotiate with AF and PCEF on the used recovery mechanism. The negotiation may take place when the entities set up a connection for the control session, or any time later when the entities perform a session related or non-session related message exchange. The recovery mechanism may also be preconfigured in the entities, meaning that no message exchange based negotiation is required. Negotiated or configured, essential information may be saved in a non-volatile memory in order for the information to be available after a failure and restart. Negotiable issue may comprise e.g. an indication to use an indication to inform about a restart, an indication to use soft recovery (i.e. the related session statuses at the restarted entity are restored only when there is anyway a reason to perform message exchange for other purposes like e.g. a user session update), an indication to send identifiers of active sessions and/or user/UE identifiers and/or IP addresses from related entities to the restarted entity after a restart for example to help the restarted entity identify correct network elements, messages (e.g. dedicated or regular) and protocols (e.g. a dedicated protocol or the application protocol) used for recovery purposes, parameters (e.g. session identifiers, user or UE identifiers, IP addresses) required or used in recovery/restoration messages/responses.

The primary mechanism (suggested here) may be based on a per need recovery/restoration of sessions, i.e. not doing any recovery/restoration action until it is necessary for a given user session. (This is to avoid a massive and loading restoration impact on the system. And active user sessions that are not changed/modified, don't need any guidance from the PCRF, because the sessions have been authorized earlier and the policy enforcement point PCEF has received the relevant PCC rules upon the authorization.)

PCRF may inform AF and PCEF about its restart.

The AF and PCEF may take this into account by including the user/UE identity and/or the IP address (in addition to the mandatory session-ID and other parameters) in session modification messages sent to PCRF after the restart to enable the PCRF to rebuild the session bindings. (Session bindings are based on IP address and user/UE identification).

Ongoing sessions without modifications and reportable events may go on untouched until naturally terminated, i.e. without sending any recovery messages to/from the PCRF, until the session termination messages are exchanged. Session terminations that are naturally initiated by AF or PCEF or another PCRF after the restart of the PCRF, are acknowledged by the restarted PCRF.

When a session (an AF session or an IP-CAN session) is modified, or there is a user plane event that is reported by the PCEF, the PCRF may receive a relevant request message (the message now providing also the user/UE identity and/or the IP address to enable the PCRF to rebuild the session bindings):

PCRF may have no status information for the session ID in the request, but the PCRF assumes this session exists, because of the indication from the AF or PCEF (or simply because a request was received after a restart where session statuses were lost). PCRF restores the session status, e.g. stores the session-ID and possibly other session status parameters for the User/UE identity and/or IP address related control session.

PCRF may start re-creating the related control sessions with other network entities, because the PCRF has lost the statuses and data (e.g. session ID) of the control session upon the failure/restart. And because the PCRF, being a server in a client/server connection, may not be able to (re-) initiate a session towards the client, the PCRF may send a recovery/restoration related request. For example, if the session modification request was received from PCEF, PCRF sends a "restore session" request to AF to restore the related control session with AF and to get the related session information (lost during the failure/restart), and PCRF may send a "restore session" request to SPR to restore the related control session with SPR and to get the related user information.

PCRF may use a recovery related step (=restore session message exchange) here to get the session status (session ID etc.) from the passive client (e.g. AF, SPR) and to be able to restore the session status and binding. The response may carry also session related information to minimize required message exchange. Alternatively, PCRF may request the session information from AF (and user information from SPR) with a regular request message after the "restore session" message exchange.

After that the PCRF may use regular protocol messages e.g.:

To send (in a response) or push (unsolicited) PCC rules (created from the session information received from AF and possibly from the user information if fetched from the SPR) to PCEF.

The PCRF may, e.g. after a preconfigured time, request the restoration of the Diameter sessions not yet restored but started by the PCEF and AF before the crash. This action clears the restart status and returns the related network elements to normal operation.

Further Details:

Please note that Diameter may be used as an example in the invention, but the main operating principles are protocol independent. Session statuses and session related information are maintained in the related network elements. However, other protocols (other than Diameter) are possible. For example, common open policy services (COPS) implementations may not even use the proposed method, because COPS has an own synchronization mechanism. Data over cable service interface specification (DOCSIS) uses COPS towards the PCEF/gateway and Diameter towards the AF. Worldwide interoperability for microwave access (WiMAX) uses 3GPP defined Diameter based Gx and Rx interfaces. Telecommunications and internet converged services and protocols for advanced networks/European telecommunications standards institute (TISPAN/ETSI) has defined an international telecommunications union-telecommunication standardization sector (ITU-T) H.248-based Ia interface between service policy decision function (SPDF) and PCEF.

"In "Restore session" procedure steps S11-S12 in FIG. 3 (and in steps S7a-S8a in FIG. 2) there are several options to choose the correct PCEF (or the correct AF) where to send the restore request. Initially, PCEF and AF select the PCRF based on UE identity, but the reverse operation may not be based on UE identity".

OPTION 1: The entity (e.g. PCEF/GW or AF) receiving the "RESTARTED" message may send the UE/user IDs and/or IP addresses, possibly even the session IDs, of the sessions it has with the restarted element (PCRF) in the response to the "RESTARTED" message. This way the restarted element (PCRF) knows/identifies the network element (e.g. PCEF/GW or AF) per UE/user, and is able to contact the correct network element.

OPTION 2: The restarted entity (e.g. PCRF) may send the "RESTORE SESSION" message (or the regular Diameter/application message) to all possible entities (e.g. PCEF/GW or AF). The acknowledgement message is received from the entity that recognizes the UE/user identity and/or IP address (whereas the other entities reject the request message). Now the restarted entity (e.g. PCRF) knows/identifies the correct network element (e.g. PCEF/GW or AF).

OPTION 3: The addresses/identities, possibly even the session IDs, of the network elements related to a given UE/user session may be saved upon each control session establishment. The addresses/identities are restored after the restart. The entity saving the information may be one or several or all of the involved entities (or an external entity). (Only one entity may not be safe enough, because it may fail and restart itself). For example, GW-1 and SPR may save the addresses/identities of each other and the address/identity of the AF related to a given UE/user session. After a restart, the saving entity can send the saved addresses/identities of the network elements, related to the UE/user identities and/or IP addresses, to restarted entity (e.g. PCRF) e.g. in a response message to the "RESTARTED" message.

Implementation Aspects:

The required recovery/restoration messages can use a separate network management protocol or the same protocol as the related interfaces support for the application, e.g. Diameter in case of 3GPP PCC/PCRF.

If/when Diameter is used, a separate Diameter session for the recovery/restoration can be used to keep the application (i.e. user session) related Diameter sessions as untouched as possible. Application related sessions can also be used for transferring recovery/restoration related information, but should be related to the recovery of the relevant application session.

New address-value-pairs (AVPs) (parameters) may be defined for the recovery/restoration actions.

The negotiation of recovery/restoration mechanisms can use a separate network management protocol, or a management dedicated session of the used application protocol (in 3GPP PCC/PCRF case the application protocol is Diameter), or a user control session of the application protocol. In case of Diameter, existing messages with possibly a few new parameters (AVPs) can be used. It is also possible to define new, management related messages.

In case of Diameter (e.g. 3GPP PCC/PCRF), the Diameter CER/CEA (=capability exchange request/answer) can be used for the negotiation. Alternatively, the Diameter application messages can be used, applying e.g. the 3GPP defined Supported-Feature AVP and mechanism to indicate/negotiate the used recovery mechanism.

For the purpose of the present invention as described herein above, it should be noted that an access technology may be any technology by means of which a user equipment can access an access network (or base station, respectively). Any present or future technology, such as WiMAX (Worldwide Interoperability for Microwave Access) or WLAN (Wireless Local Access Network), BlueTooth, Infrared, and the like may be used; although the above technologies are mostly wireless access technologies, e.g. in different radio spectra, access technology in the sense of the present invention may also imply wirebound technologies, e.g. IP based access technologies like cable networks or fixed line.

a network may be any device, unit or means by which a station entity or other user equipment may connect to and/or utilize services offered by the access network; such services include, among others, data and/or (audio-) visual communication, data download etc.;

generally, the present invention may be applicable in those network/user equipment environments relying on a data packet based transmission scheme according to which data are transmitted in data packets and which are, for example, based on the Internet Protocol IP. The present invention is, however, not limited thereto, and any other present or future IP or mobile IP (MIP) version, or, more generally, a protocol following similar principles as (M)IPv4/6, is also applicable;

a user equipment may be any device, unit or means by which a system user may experience services from an access network;

method steps likely to be implemented as software code portions and being run using a processor at a network element or terminal (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the invention in terms of the functionality implemented;

method steps and/or devices, units or means likely to be implemented as hardware components at the above-defined apparatuses, or any module(s) thereof, are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components; in addition, any method steps and/or devices, units or means likely to be implemented as software components may alternatively be based on any security architecture capable e.g. of authentication, authorization, keying and/or traffic protection;

devices, units or means (e.g. the above-defined apparatuses, or any one of their respective means) can be implemented as individual devices, units or means, but this does not exclude that they are implemented in a distributed fashion throughout the system, as long as the functionality of the device, unit or means is preserved;

an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

According to an example of the present invention, in a first aspect, this object is for example achieved by a method comprising:

establishing a control session by transmitting and receiving control session-related messages;

transmitting restart information indicating a restart of a network element;

receiving at least one protocol-related message of a first control session including session-related detail information;

transmitting a restoration request message based on the session-related detail information;

receiving at least one session parameter necessary for restoring the at least one first session; and restoring the at least one first session based on the received session-related detail information and the at least one session parameter.

According to further refinements of the example of the present invention as defined under the above first aspect, the restoring further comprises:

restoring a second control session related to the first control session, based on the transmitted restoration request message and the received at least one session parameter; and binding the first control session and the second control session based on at least one of the received at least one session parameter and detail information;

the protocol-related message is a session modification request, received from one of a policy and charging enforcement function, an application function and bearer binding and event reporting function, and the restoration request message is a restore session request, transmitted to one of the policy and charging enforcement function, the application function, the bearer binding and event reporting function and a subscription profile repository;

the restoration request message is requesting session information from one of an application function, a policy and charging enforcement function and a user information from a subscription profile repository;

the method comprises further requesting, after a preconfigured time, restoration of at least one session not yet restored but started before the restart;

the network element, the restoration request message is sent to, is found using one of the following:

(a) at least one of session identifiers, user/user equipment identifiers and internet protocol addresses are received from an entity that received the restart information;

(b) the restarted entity sends the restoration request to all possible entities and receives an acknowledgement from the entity that recognizes the parameters of the message;

(c) at least one of session identifiers, user/user equipment identifiers and IP addresses of network elements are saved in a network entity and restored by the restarted entity after the restart;

the transmitting of the restoration request message is triggered by modification of a session or by a user plane event;

the restoration request message is part of or constitutes one of a restore session message and a diameter or application message and comprises at least one of user identifications and internet protocol addresses.

According to an example of the present invention, in a second aspect, this object is for example achieved by a method comprising:

establishing a control session by transmitting and receiving control session-related messages;

receiving restart information indicating a restart of a network element;

processing (Sproc) at least one protocol-related message of a first control session to include session-related detail information; and transmitting i) at least one session parameter necessary for restoring the at least one first session, and ii) the at least one protocol related message.

According to further refinements of the example of the present invention as defined under the above first and the second aspect, the session-related detail information comprises at least one of user identifications, internet protocol addresses and session identifications;

the session-related detail information is part of an acknowledgement message from an entity recognizing the at least one of user identifications and internet protocol addresses;

the session-related detail information is stored upon each control session establishment and sent to the restarted network entity after the restart;

the method comprises further negotiating a restoration scheme upon connection set up for a control session or at a later message exchange before the restart or at the restart indication message exchange;

the method comprises further negotiating a restoration scheme upon performing one of a session-related message exchange and a non-session-related message exchange;

the negotiation comprises at least one of
(i) an indication of restoring sessions only when a related user session induces a message,
(ii) an indication to send at least one of identifiers of active sessions, user/user equipment identifiers and IP addresses from related entities to the restarted entity after a restart,
(iii) messages used for recovery purposes,
(iv) protocols used for recovery purposes, and
(v) parameters required or used in recovery/restoration messages/responses; and
the restoring comprises further restoration of session bindings based on internet protocol addresses and/or user identifications and/or session identifications.

According to an example of the present invention, in a third aspect, this object is for example achieved by an apparatus comprising:

establishing unit being configured to establish a control session by transmitting and receiving control session-related messages;
transmitting unit being configured to transmit restart information indicating a restart of a network element;
receiving unit being configured to receive at least one protocol-related message of a first control session including session-related detail information;
transmitting unit being further configured to transmit a restoration request message based on the session-related detail information;
receiving unit being further configured to receive at least one session parameter necessary for restoring the at least one first session; and
restoring unit being configured to restore the at least one first session based on the received session-related detail information and the at least one session parameter.

According to further refinements of the example of the present invention as defined under the above third aspect,
the restoring unit is further configured to:
restore a second control session related to the first control session, based on the transmitted restoration request message and the received at least one session parameter; and to
bind the first control session and the second control session based on at least one of the received at least one session parameter and detail information;
the protocol-related message is a session modification request, received from one of a policy and charging enforcement function, an application function and bearer binding and event reporting function, and the restoration request message is a restore session request, transmitted to one of the policy and charging enforcement function, the application function, the bearer binding and event reporting function and a subscription profile repository;
the restoration request message is requesting session information from one of an application function, a policy and charging enforcement function and a user information from a subscription profile repository;
The apparatus further comprises a requesting unit for requesting, after a preconfigured time, restoration of at least one session not yet restored but started before the restart;
the network element, the restoration request message is sent to, is found using one of the following:
(a) at least one of session identifiers, user/user equipment identifiers and internet protocol addresses are received from an entity that received the restart information;
(b) the restarted entity sends the restoration request to all possible entities and receives an acknowledgement from the entity that recognizes the parameters of the message;
(c) at least one of session identifiers, user/user equipment identifiers and IP addresses of network elements are saved in a network entity and restored by the restarted entity after the restart;
transmitting of the restoration request message is triggered by modification of a session or by a user plane event;
the restoration request message is part of or constitutes one of a restore session message and a diameter or application message and comprises at least one of user identifications and internet protocol addresses;
the apparatus is constituted by a policy and charging rules function.

According to an example of the present invention, in a fourth aspect, this object is for example achieved by an apparatus comprising:

establishing unit being configured to establish a control session by transmitting and receiving control session-related messages;
receiving unit being configured to receive restart information indicating a restart of a network element;
processing unit being configured to process at least one protocol-related message of a first control session to include session-related detail information; and
transmitting unit being configured to transmit
i) at least one session parameter necessary for restoring the at least one first session, and
ii) the at least one protocol related message.

According to further refinements of the example of the present invention as defined under the above fourth aspect,
the session-related detail information comprises at least one of user identifications, internet protocol addresses and session identifications;
the session-related detail information is part of an acknowledgement message from an entity recognizing the at least one of user identifications and internet protocol addresses;
the session-related detail information is stored upon each control session establishment and sent to the restarted network entity after the restart;
the apparatus further comprises a negotiating unit being configured to negotiate a restoration scheme upon connection set up for a control session or at a later message exchange before the restart or at the restart indication message exchange;
the apparatus further comprises a negotiating unit for negotiating a restoration scheme upon performing one of a session-related message exchange and a non-session-related message exchange;
the negotiation unit is further configured to negotiate based on at least one of
(i) an indication of restoring sessions only when a related user session induces a message,
(ii) an indication to send at least one of identifiers of active sessions, user/user equipment identifiers and IP addresses from related entities to the restarted entity after a restart,
(iii) messages used for recovery purposes,
(iv) protocols used for recovery purposes, and
(v) parameters required or used in recovery/restoration messages/responses;
The restoring unit is further configured to restore session bindings based on internet protocol addresses and/or user identifications and/or session identifications;

the apparatus is constituted by at least one of a policy and charging enforcement function, an application function, a proxy call state control function, a bearer binding and event reporting function and a subscription profile repository.

Although the present invention has been described herein before with reference to particular embodiments thereof, the present invention is not limited thereto and various modification can be made thereto.

The invention claimed is:

1. A method, comprising:
    establishing a control session by transmitting and receiving control session-related messages;
    transmitting restart information, by a policy-and-charging-rules-function network element, indicating a restart of the policy-and-charging-rules-function network element, wherein the restart information is transmitted by the policy-and-charging-rules-function network element to a policy-and-charging-enforcement-function network element or an application-function network element;
    when there is a reason for at least one protocol-related message of a first control session to be sent, the reason comprising a request for an IP connectivity access network session modification or a request for a user plane event, receiving, by the policy-and-charging-rules-function network element, the at least one protocol-related message of the first control session including session-related detail information;
    transmitting a restoration request message based on the session-related detail information;
    receiving at least one session parameter necessary for restoring the at least one first control session; and
    restoring the at least one first control session based on the received session-related detail information and the at least one session parameter.

2. The method according to claim 1, wherein the restoring further comprises:
    restoring a second control session related to the first control session, based on the transmitted restoration request message and the received at least one session parameter; and
    binding the first control session and the second control session based on at least one of the received at least one session parameter and detail information.

3. The method according to claim 1, wherein the protocol-related message is a session modification request, received from one of a policy and charging enforcement function, an application function and bearer binding and event reporting function, and the restoration request message is a restore session request, transmitted to one of the policy and charging enforcement function, the application function, the bearer binding and event reporting function and a subscription profile repository.

4. The method according to claim 1, wherein the restoration request message is requesting session information from one of an application function, a policy and charging enforcement function and a user information from a subscription profile repository.

5. The method according to claim 1, wherein the network element, to which the restoration request message is sent to, is found using one of the following:
    (a) at least one of session identifiers, user/user equipment identifiers and internet protocol addresses are received from an entity that received the restart information;
    (b) the restarted entity sends the restoration request to all possible entities and receives an acknowledgement from the entity that recognizes the parameters of the message;
    (c) at least one of session identifiers, user/user equipment identifiers and IP addresses of network elements are saved in a network entity and restored by the restarted entity after the restart.

6. The method according to claim 1, wherein the transmitting of the restoration request message is triggered by modification of a session or by a user plane event.

7. The method according to claim 1, wherein the restoration request message is part of or constitutes one of a restore session message and a diameter or application message and comprises at least one of user identifications and internet protocol addresses.

8. A method comprising:
    establishing a control session by transmitting and receiving control session-related messages;
    receiving restart information, from a policy-and-charging-rules-function network element, indicating a restart of the policy-and-charging-rules-function network element, wherein the restart information is received from the policy-and-charging-rules-function network element by a policy-and-charging-enforcement-function network element or by an application-function network element;
    processing at least one protocol-related message of a first control session to include session-related detail information; and transmitting, to the network element,
        i) at least one session parameter necessary for restoring the at least one first session, and
        ii) the at least one protocol-related message,
    wherein the processing and transmitting are performed when there is a reason for at least one protocol-related message of the first control session to be sent, the reason comprising a request for an IP connectivity access network session modification or a request for a user plane event.

9. The method according to claim 1, wherein the session-related detail information comprises at least one of user identifications, internet protocol addresses and session identifications.

10. The method according to claim 1, wherein the session-related detail information is part of an acknowledgement message from an entity recognizing the at least one of user identifications and internet protocol addresses.

11. The method according to claim 1, wherein the session-related detail information is stored upon each control session establishment and sent to the restarted network entity after the restart.

12. The method according to claim 1, further comprising negotiating a restoration scheme upon connection set up for a control session or at a later message exchange before the restart or at the restart indication message exchange.

13. The method according to claim 1, further comprising negotiating a restoration scheme upon performing one of a session-related message exchange and a non-session-related message exchange.

14. The method according to claim 12, wherein the negotiation comprises at least one of
    (i) an indication of restoring sessions only when a related user session induces a message,
    (ii) an indication to send at least one of identifiers of active sessions, user/user equipment identifiers and IP addresses from related entities to the restarted entity after a restart,
    (iii) messages used for recovery purposes, (iv) protocols used for recovery purposes, and
(v) parameters required or used in recovery/restoration messages/responses.

15. The method according to claim 1, wherein the restoring further comprises restoration of session bindings based on internet protocol addresses and/or user identifications and/or session identifications.

16. An apparatus, comprising:
at least one processor; and
at least one non-transitory computer-readable memory including computer program code, the at least one memory and the computer program code configured, with the at least one processor, to cause the apparatus at least to
establish a control session by transmitting and receiving control session-related messages;
transmit restart information, by a policy-and-charging-rules-function network element, indicating a restart of the policy-and-charging-rules-function network element, wherein the restart information is transmitted by the policy-and-charging-rules-function network element to a policy-and-charging-enforcement-function network element or an application-function network element;
when there is a reason for at least one protocol-related message of a first control session to be sent, the reason comprising a request for an IP connectivity access network session modification or a request for a user plane event, receive, by the policy-and-charging-rules-function network element, at the least one protocol-related message of the first control session including session-related detail information;
transmit a restoration request message based on the session-related detail information;
receive at least one session parameter necessary for restoring the at least one first control session; and
restore the at least one first control session based on the received session-related detail information and the at least one session parameter.

17. The apparatus according to claim 16, wherein the apparatus is further caused to:
restore a second control session related to the first control session, based on the transmitted restoration request message and the received at least one session parameter; and to
bind the first control session and the second control session based on at least one of the received at least one session parameter and detail information.

18. The apparatus according to claim 16, wherein the protocol-related message is a session modification request, received from one of a policy and charging enforcement function, an application function and bearer binding and event reporting function, and the restoration request message is a restore session request, transmitted to one of the policy and charging enforcement function, the application function, the bearer binding and event reporting function and a subscription profile repository.

19. The apparatus according to claim 16, wherein the restoration request message is requesting session information from one of an application function, a policy and charging enforcement function and a user information from a subscription profile repository.

20. The method according to claim 1, further comprising requesting, after a preconfigured time, restoration of at least one session not yet restored but started before the restart.

* * * * *